(12) United States Patent
Stählin

(10) Patent No.: US 11,256,727 B2
(45) Date of Patent: Feb. 22, 2022

(54) METHOD FOR TRANSMITTING DATA FROM A VEHICLE TO A SERVER, AND METHOD FOR UPDATING A MAP

(71) Applicant: Continental Teves AG & Co. oHG, Frankfurt am Main (DE)

(72) Inventor: Ulrich Stählin, Rochester, MI (US)

(73) Assignee: Continental Teves AG & Co. oHG

(*) Notice: Subject to any disclaimer, the term of this patent is extended or adjusted under 35 U.S.C. 154(b) by 260 days.

(21) Appl. No.: 16/321,300

(22) PCT Filed: Jul. 25, 2017

(86) PCT No.: PCT/DE2017/200073
§ 371 (c)(1),
(2) Date: Jan. 28, 2019

(87) PCT Pub. No.: WO2018/024298
PCT Pub. Date: Feb. 8, 2018

(65) Prior Publication Data
US 2019/0163689 A1     May 30, 2019

(30) Foreign Application Priority Data
Aug. 1, 2016  (DE) .......................... 102016214156.2

(51) Int. Cl.
| | | |
|---|---|---|
| *G06F 16/29* | (2019.01) | |
| *G01C 21/14* | (2006.01) | |
| *G01S 19/42* | (2010.01) | |
| *G07C 5/00* | (2006.01) | |
| *G01S 5/00* | (2006.01) | |
| *G01C 21/32* | (2006.01) | |
| *G01S 19/39* | (2010.01) | |
| *G01S 19/03* | (2010.01) | |
| *G06F 16/23* | (2019.01) | |

(52) U.S. Cl.
CPC .............. *G06F 16/29* (2019.01); *G01C 21/14* (2013.01); *G01C 21/32* (2013.01); *G01S 5/0036* (2013.01); *G01S 19/396* (2019.08); *G01S 19/42* (2013.01); *G06F 16/23* (2019.01); *G07C 5/008* (2013.01); *G01S 19/03* (2013.01)

(58) Field of Classification Search
CPC combination set(s) only.
See application file for complete search history.

(56) References Cited

U.S. PATENT DOCUMENTS

| | | | |
|---|---|---|---|
| 6,823,260 B1 * | 11/2004 | Turcotte | H04L 67/18 701/484 |
| 8,471,763 B2 | 6/2013 | Daems et al. | |
| 8,600,661 B2 | 12/2013 | Abraham et al. | |

(Continued)

OTHER PUBLICATIONS

International Search Report and Written Opinion for International Application No. PCT/DE2017/200073, dated Jan. 22, 2018—8 pages.

(Continued)

*Primary Examiner* — Christian Chace
*Assistant Examiner* — Amelia Vorce
(74) *Attorney, Agent, or Firm* — RatnerPrestia

(57) ABSTRACT

A method for transmitting data from a vehicle to a server. The data transmitted to the server including raw satellite navigation data received by the vehicle from a satellite. The server updates a map based on the raw satellite navigation data.

13 Claims, 1 Drawing Sheet

(56) References Cited

U.S. PATENT DOCUMENTS

| | | | | |
|---|---|---|---|---|
| 10,861,255 | B1* | 12/2020 | Karp | G01C 21/3476 |
| 2004/0230373 | A1* | 11/2004 | Tzamaloukas | G01C 21/28 |
| | | | | 701/468 |
| 2007/0219708 | A1* | 9/2007 | Brasche | G08G 1/0962 |
| | | | | 701/457 |
| 2009/0138188 | A1 | 5/2009 | Kores et al. | |
| 2009/0170537 | A1* | 7/2009 | Mauti, Jr. | H04L 67/04 |
| | | | | 455/466 |
| 2011/0131666 | A1* | 6/2011 | Tanaka | G07C 5/085 |
| | | | | 726/30 |
| 2012/0183023 | A1* | 7/2012 | Filipovic | G01S 19/09 |
| | | | | 375/220 |
| 2014/0057649 | A1* | 2/2014 | Han | H04W 4/025 |
| | | | | 455/456.1 |
| 2014/0221005 | A1 | 8/2014 | Marshall et al. | |
| 2014/0273858 | A1* | 9/2014 | Panther | A61B 5/4812 |
| | | | | 455/41.2 |
| 2014/0275852 | A1* | 9/2014 | Hong | A61B 5/0205 |
| | | | | 600/301 |
| 2015/0127249 | A1* | 5/2015 | Strau | G08G 1/0112 |
| | | | | 701/439 |
| 2015/0247928 | A1* | 9/2015 | Waters | G01S 19/09 |
| | | | | 342/357.4 |
| 2015/0334678 | A1* | 11/2015 | MacGougan | H04W 4/185 |
| | | | | 701/451 |
| 2015/0338221 | A1* | 11/2015 | Siris | G06N 5/04 |
| | | | | 701/409 |
| 2016/0061614 | A1* | 3/2016 | Lee | G01C 21/30 |
| | | | | 701/446 |
| 2016/0139272 | A1* | 5/2016 | Basnayake | G01S 19/39 |
| | | | | 342/357.52 |
| 2016/0205653 | A1* | 7/2016 | Kim | H04W 12/10 |
| | | | | 455/456.5 |
| 2016/0221818 | A1* | 8/2016 | Gotz | G06Q 50/06 |
| 2016/0231750 | A1* | 8/2016 | Kawamata | G06Q 10/08 |
| 2016/0300404 | A1* | 10/2016 | Harter | G07C 5/008 |
| 2016/0364919 | A1* | 12/2016 | Peeters | G01S 19/42 |
| 2017/0052260 | A1* | 2/2017 | Ramamurthy | G01S 19/23 |
| 2017/0059715 | A1* | 3/2017 | Wietfeldt | G01S 19/28 |
| 2017/0061790 | A1* | 3/2017 | Jana | H04W 4/46 |
| 2017/0064727 | A1* | 3/2017 | Chrisikos | G01S 19/42 |
| 2017/0070971 | A1* | 3/2017 | Wietfeldt | G01S 19/074 |
| 2017/0219360 | A1* | 8/2017 | Cui | G01S 19/393 |
| 2017/0330392 | A1* | 11/2017 | Jordan | G06F 13/14 |
| 2017/0357009 | A1* | 12/2017 | Raab | G01S 19/48 |
| 2018/0238691 | A1* | 8/2018 | Cui | G01S 19/393 |
| 2018/0357839 | A1* | 12/2018 | Knorr | G07C 5/008 |

OTHER PUBLICATIONS

European Communication Pursuant to Article 94(3) EPC for European Application No. 17 811 191.0, dated Feb. 17, 2021, 5 pages.

* cited by examiner

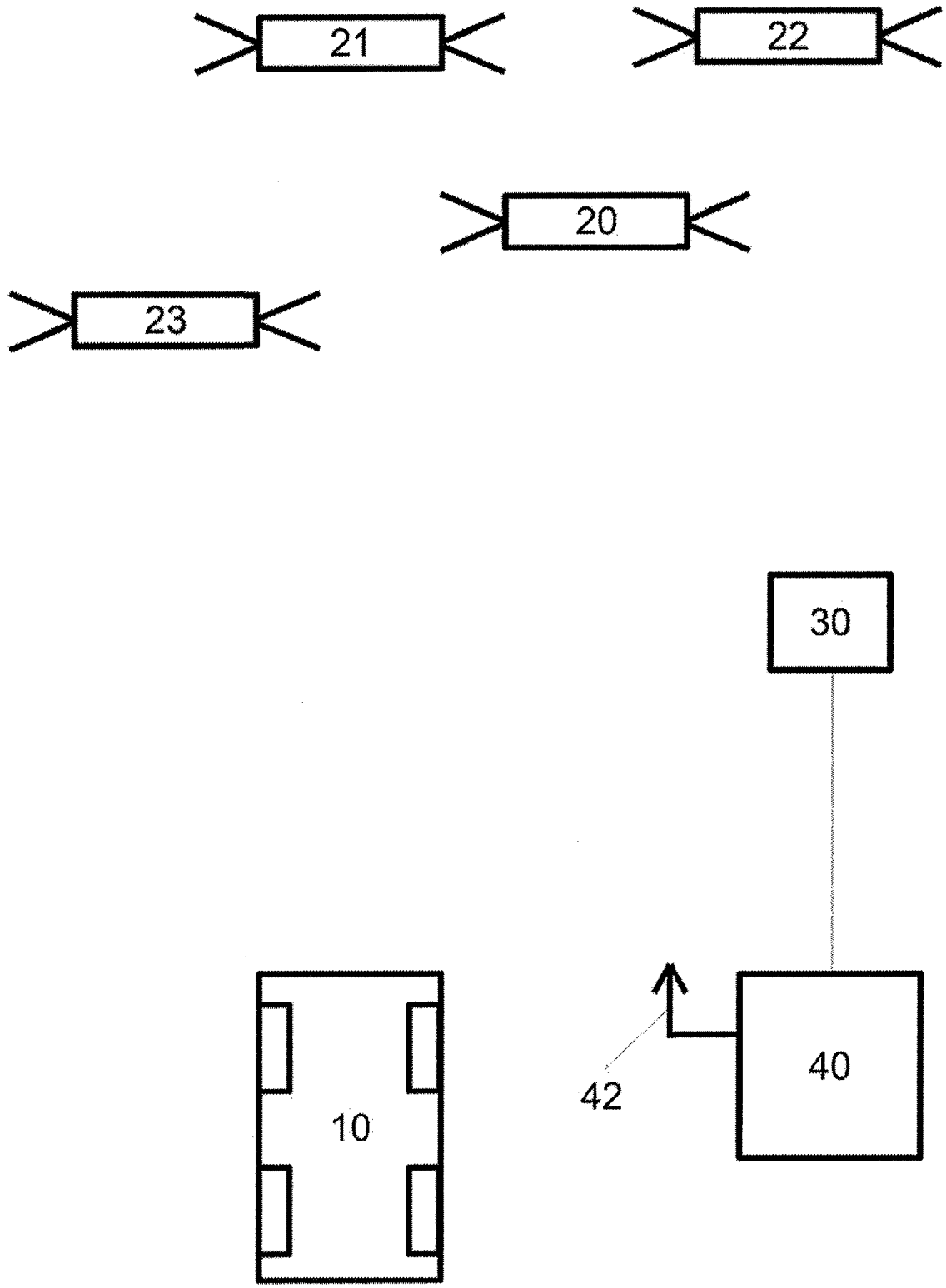

METHOD FOR TRANSMITTING DATA FROM A VEHICLE TO A SERVER, AND METHOD FOR UPDATING A MAP

CROSS REFERENCE TO RELATED APPLICATIONS

This application is the U.S. National Phase Application of PCT International Application No. PCT/DE2017/200073, filed Jul. 25, 2017, which claims priority to German Patent Application No. 10 2016 214 156.2, filed Aug. 1, 2016, the contents of such applications being incorporated by reference herein.

FIELD OF THE INVENTION

The invention relates to a method for transmitting data from a vehicle to a server. The invention also relates to a method for updating a map via a server.

BACKGROUND OF THE INVENTION

The determination of the position of vehicles by means of satellite navigation (GNSS=Global Navigation Satellite System) has been well established for a long time. The generation of map material on the basis of data from vehicles determined such is also known or is at least the prior art.

To date, for navigation tasks or, for example, for an eHorizon, data has typically been stored fixedly in the vehicle or obtained via a server. Such data is usually acquired from a service provider using special vehicles. These vehicles are equipped with measuring instruments that are very precise, and thus very sophisticated and expensive. For example, these measuring instruments can be high-quality dual-frequency or multi-frequency receivers for a particularly accurate determination of positions, possibly accompanied by Inertial Measurement Units (IMU) of very high quality. However, these devices are very expensive, and the provided map material is therefore also very expensive.

It would be desirable to avoid use of these special vehicles, and to learn the map data on a server based on data collected by standard vehicles.

The use of high-quality dual-frequency receivers with correction data in order to create map data of corresponding high quality and precision therefrom is also being taken into consideration. However, this is more expensive than the option of using normal satellite navigation receivers.

SUMMARY OF THE INVENTION

Aspects of the invention are methods that allow the creation of maps with the lowest possible effort/cost.

An aspect of the invention relates to a method for transmitting data from a vehicle to a server, wherein the method has the following steps:
  receiving satellite navigation signals,
  determining raw data from the satellite navigation signals,
  determining position data from the raw data,
  making up data packets, wherein the data packets at least partially contain raw data, and
  transmitting the data packets to the server.

With the method according to an aspect of the invention, not only detected positions, but, in particular, also so-called raw data are directly outputted to a server so that these can be used, for example, to create or update a map. In particular, a standard satellite navigation receiver can be used for this purpose. However, such a receiver should be capable of outputting the raw data. The position data can but does not have to be co-transmitted to the server (see explanation in further detail below). The position data particularly serves to perform self-navigation/self-locating of the vehicle that is carrying out the method.

It should be understood that the step of determining position data from the raw data can be omitted in principle if this is advantageous in a current situation or if the position is not otherwise required in the vehicle. The step mentioned here only relates to the typical application of the position data.

In particular, a mobile communications connection or vehicle-to-X communication can be used to transmit the data packets to the server. It is, however also possible to use other radio techniques or data transmission techniques.

The raw data preferably includes one or more f the following types of data:
  pseudoranges,
  Doppler data,
  carrier phase counter,
  measurement signal status,
  signal-to-noise ratio,
  time stamp,
  ephemeris data,
  ionospheric data,
  UTC leap second,
  SBAS (Satellite Based Augmentation System) data.

This data is typically data which is first determined/calculated in a satellite navigation module or a satellite navigation receiver on the basis of the received, satellite navigation signals. Typically, this raw data is then immediately used again to obtain a position, a velocity or similar data material for use in navigation tasks of the vehicle. It should be understood that, in the context of carrying out the method according to an aspect of the invention, precisely this raw data is not only used for this purpose, but also transmitted to a server that can then use it, in particular to create especially precise maps or to update maps, wherein no particular design of a satellite receiver is required for this purpose. In particular, it is not necessary to design it in the form of a dual-frequency receiver.

Preferably, the data packets at least partially also contain position data, which allows matching against the data determined by the vehicle itself so that, for example, a position that the server determines on the basis of the raw data can be verified with the position determined by the vehicle itself.

In particular, the position data can indicate a location and/or a velocity and/or a time of the vehicle. This is typical data used for the navigation of a vehicle. For example, a course of a road can be reconstructed on the basis of several locations when the vehicle follows a road.

Preferably, the position data can be determined by merging the raw data with data of the dynamics of vehicle movement. The data of the dynamics of vehicle movement can come from, for example, inertial sensors, wheel speed sensors, steering-angle sensors, cameras, radar equipment, or other sensors of the vehicle. In this way, it, is possible to obtain particularly high accuracy and reliability.

In the step of determining the position, an accuracy of the position data is preferably determined, which can be performed, for example, on the basis of the raw data or the satellite navigation signals, thereby obtaining a degree of the accuracy of the position data, wherein it is possible to determine whether the position data is sufficient for determining a course of a road, for example.

According to a preferred embodiment, the data packets are made up depending on a number of parameters. In this way, the data packets can be made up variably so that an optimal compilation of the data packets always takes place.

In this context, one parameter can in particular be the accuracy of the position data. Other parameters can be, for example, the number of visible satellites, a driven lateral and/or longitudinal acceleration, or a deviation from the map in map matching. For example, respective absolute or relative threshold values can be predetermined for such parameters.

According to one embodiment it can be provided that if the precision f the position data exceeds a threshold value, no raw data will be included in the data packets. In this way, transmitting raw data can be avoided if the accuracy of the position data is already sufficient for creating or updating a map.

According to one embodiment it can be provided that if the accuracy of the position data falls below a threshold value, raw data will be included in the data packets. In this way, the server is able to evaluate the raw data by itself and thus determine the position, wherein such a server will be able, for example, to resort to a higher computing power and a longer period of time than the vehicle can do internally.

It should be understood that the two threshold values just mentioned cancan be identical or different from each other.

The data packets can at least partially also contain data of the dynamics of vehicle movement and/or correction data. This data can also be used by a server for the improved creation or updating of a map.

The data packets can be made up depending on instructions that were received from the server. In this way, the server can request, for example, for particular regions or roads, that particular data, such as raw data for particularly accurate self-locating, be transmitted to the server, in particular if no good data is available yet in the respective region.

According to a preferred embodiment, the data packets or at least a part of the data packets, in particular raw data and/or data of the dynamics of vehicle movement, can be stored first and transmitted only when a particular communications network, in particular WLAN, is available. In this way, data transmission capacity or the volume of mobile communications networks that otherwise can be used to transmit corresponding data to a server, for example, can be spared. A vehicle can simply collect the corresponding data during the day or during the journey and transmit the collected data to the server when an appropriately efficient and cost-effective connection, such as WLAN, is available.

In particular, the data can also be encrypted in order to preclude any manipulations. Particularly preferably, the data is already encrypted in the vehicle and the encrypted data is transmitted to the server.

In order to obtain increased security, it is also possible to additionally receive and co-transmit data from the so-called Public Regulated Services (PRS), of satellite navigation systems (e.g., Galileo). It can then be detected if the data was already changed before reaching the receiver, by means of spoofing, for example. In a back-end, this PRS data that is already encrypted upon reception can be decrypted, and thus any malicious changes can be detected.

An aspect of the invention also relates to a method for updating p via a server, said method having the following steps:
    receiving a plurality of data packets which are each transmitted from a plurality of vehicles by means of an inventive method,
    calculating map data at least partially on the basis of the raw data and/or data of the dynamics of vehicle movement contained in the data packets, and
    updating the map depending on the map data, and preferably also depending on the position data contained in the data packets.

By means of such a method, the data transmitted according to any of the methods according to an aspect of the invention for transmitting data to a server described above can advantageously be used to update a map. In particular, this map can be an electronic road map.

It should be understood that "updating" here generally also means "creating a map".

With respect to the method for transmitting the data, recourse can be made to all embodiments and variants described herein.

It should be understood that a server has, in particular, a significantly higher computing capacity and also more time available than a vehicle to determine position data from the raw data, and possibly has additional information about the satellite signals used, such as more correction data or information about disturbances (caused by solar storms, for example). Thus, even with the same available raw data obtained from the satellite navigation system in the vehicle, the server can determine the position of the vehicle more accurately than the vehicle can do by itself. The raw data can thus be used to update the map better than in the case of an exclusive transmission of position data by the vehicle to the server.

According to a further development, the method further has the following steps:
    determining a number of instructions, wherein the instructions indicate in what regions or under what other conditions raw data or position data is to be transmitted, and
    transmitting the instructions to a number of vehicles, each vehicle carrying out method according to an aspect of the invention for transmitting data.

By means of this embodiment, the server can determine by itself as to which regions it wants to get particular data, for example raw data, from vehicles. If a region is still badly covered, the server can instruct the vehicles to preferably transmit raw data in order to determine by itself a position with the highest possible accuracy and thus courses of roads. By such instructions, the threshold values mentioned above can be influenced, for example. If, in contrast, a region is already covered particularly well and accurately, the instruction can be used to communicate to the vehicles that only a small amount of data (for example, no raw data) is to be transmitted from this region.

Generally, it can also be said that a standard satellite navigation receiver can be used that can, however, also output the so-called raw data. Data of this satellite navigation receiver can be merged with data of the dynamics of vehicle movement and a position can be calculated therefrom. Furthermore, additional data can be calculated.

The quality of the reception conditions for satellite navigation and the degree of accuracy likely to be achieved with this quality can be checked prior to transmitting the data to a server. Depending on the achievable accuracy, different data can be transmitted to the server/a back-end.

Advantageously, only the calculated positions will be transmitted if the achievable precision is high enough.

If the achievable accuracy is not high enough, the raw data and the corresponding data of the dynamics of vehicle movement will advantageously be transmitted, instead of or in addition to the calculated positions, to the server/the back-end. There a correspondingly more accurate position, which can then be used for learning the map, can be determined by means of high-quality algorithms, such as forward-backward calculation, or even with the help of correction data. Parts of the correction data can here also be satellite constellations so that the selection of the satellites to be used for position calculation can be optimized on the basis of this external information.

It is also possible that the server/the back-end communicates to the vehicle in what regions it prefers to get raw data and/or data of the dynamics of vehicle movement, for example, because in a particular region the data corpus in the back-end is sparse or accuracy has been insufficient. Other reasons are also conceivable.

Another possibility for the decision of what data to transmit can be threshold values, such as the number of visible satellites, a driven latera and/or longitudinal acceleration, or a deviation from the map in map matching.

In order to save on communication costs, the storage of the data during the journey and the subsequent transmission of the data by means of WLAN, for example, when such a connection is available (in a parking space at home, for example) is solution.

This approach is above all a solution for the raw data and the data of the dynamics of vehicle movement because the amounts of data here are significantly larger than in the case of the position data already determined by means of merging. Since the raw data implicitly contain a time stamp, it is also possible to transmit the data some time after measuring and still be able to establish a clear time reference on the server.

A solution for preventing the data from being changed on its way to the back-end is encrypting the data in the vehicle directly or signing it with a digital certificate. It is possible to additionally improve the reliability of the data by co-transmitting data from the so-called Public Regulated Services (PRS) in addition to encryption (see description above).

By means of the method described here, the required accuracy for a learned map can be achieved in spite of a reduced use of hardware and, above all, at considerably reduced costs, thereby also being able to expand the base of vehicles that determine data since satellite navigation receivers are now usually installed in almost all vehicles.

An aspect of the invention also relates to a control module and a vehicle that is configured to carry out method according to an aspect of the Invention. An aspect of the invention also relates to a server that is configured to carry out a method according to an aspect of the invention. Furthermore, an aspect of the invention relates to a non-volatile machine-readable storage medium on which a program code is stored, wherein a processor will carry out an inventive method when said program code is executed, wherein each case recourse can be made to all embodiments and variants described here with respect to the method according to an aspect of the invention.

BRIEF DESCRIPTION OF THE DRAWINGS

A person skilled in the art will infer further features and advantages from the exemplary embodiment described hereinafter with reference to the attached drawing in which The FIGURE shows an arrangement for carrying out the method according to an aspect of the invention.

DETAILED DESCRIPTION OF THE PREFERRED EMBODIMENTS

The FIGURE shows a vehicle 10 that is only shown here schematically. The vehicle 10 is designed to carry out a method according to invention according to an exemplary embodiment.

The FIGURE also shows a server 30 that is likewise designed carry oar method according to an aspect of the invention.

In principle, the vehicle 10 is capable of determining its position at any time. For this purpose, it can receive signals from a satellite navigation system, wherein four satellites are shown here by way of example, namely a first satellite 20, a second satellite 21, a third satellite 22 and a fourth satellite 23, which are only shown here schematically and by way of example for a multitude of satellites of a typical satellite navigation system.

Furthermore, the vehicle 10 is configured to generate and store also raw data that is calculated from satellite signals. In particular, this raw data will be stored if a calculated accuracy of the determination of the position from satellite navigation falls below a predetermined threshold value.

The raw data will be stored in the vehicle 10 until the vehicle comes into the range of a WLAN, which is shown here schematically in the form of a house 40 with a MAN antenna 42. The house 40 can be, for example, the house of the owner of the vehicle 10.

When the vehicle 10 is parked next to the house 40, the vehicle 10 establishes a connection to the worldwide Internet via the WLAN antenna 42. The server 30 is connected to the Internet so that the vehicle 10 can subsequently transmit the raw data to the server 30. The server 30 can then use this raw data to carry out an especially accurate determination of the position. In this way, the server 30 can update maps, which can then be used for navigation purposes by a multitude of vehicles.

It should be understood that the data transmitted to the server 30 by the vehicle 10 will typically be anonymized so that a personalized tracking of the exact travel route of the vehicle 10 will be impossible. Such an implementation is usually necessary in order to gain users' acceptance of the method according to an aspect of the invention.

Mentioned steps of the method according to an aspect of the invention can be performed in the stated order. However, they can also be performed in a different order. In one of its embodiments, for example, with a particular composition of steps, the method according to an aspect of the invention can be carried out such that no further steps are performed. In principle, however, further steps, even unmentioned ones, can also be performed.

The claims belonging to the application do not amount to a renouncement of achieving more extensive, protection.

If it turns out, over the course of the procedure, that a feature or a group of features is not absolutely necessary, the applicant already requests now a wording of at least one independent claim in which the feature or group of features is no longer included. This may, for example, be a sub-combination of a claim present at the filing date or a sub-combination limited by further features of a claim present at the filing date. Such claims or combinations of features which are to be reworded should be understood as also covered by the disclosure of this application.

It should also be pointed out that configurations, features and variants of aspects of the invention, which are described in the various embodiments or exemplary embodiments and/or shown in the figures, may be combined together as desired. Individual or several features are interchangeable as desired. Resultant combinations of features should be as also covered by the disclosure of this application.

Back-references in dependent claims should not be understood to amount to renouncing independent objective protection for the features of the back-referenced subclaims. These features may also be combined as desired with other features.

Features which are only disclosed in the description or features which are disclosed in the description or in a claim only in conjunction with other features may in principle independently have significance which are essential to aspects of the invention. They may therefore also be included individually in claims for the purpose of differentiation from the prior art.

The invention claimed is:

1. A device in a vehicle for transmitting raw satellite navigation data a server, the device comprising:
    a vehicle dynamics sensor configured to sense vehicle dynamics data;
    a satellite navigation receiver configured to receive satellite navigation signals; and
    a processor configured to:
        determine the raw satellite navigation data from the satellite navigation signals, the raw satellite navigation data including at least one of pseudoranges, Doppler data, carrier phase counter, measurement signal status, signal-to-noise ratio, ephemeris data, ionospheric data, UTC leap second, and SBAS (Satellite Based Augmentation System) data,
        determine position data from the raw satellite navigation data and the vehicle dynamics data,
        create data packets that contain the position data and at least partially contain the raw satellite navigation data, in response to the device determining that an accuracy of the position data is below a threshold,
        create data packets that contain the position data and do not contain the raw satellite navigation data, in response to the device determining that the accuracy of the position data is not below the threshold, and
        transmit the created data packets to the server.

2. The device according to claim 1, wherein the raw data includes a time stamp.

3. The device according to claim 1, wherein the data packets at least partially also contain the position data.

4. The device according to claim 1, wherein the position data indicates at least one of a location, a velocity, or a time associated with the position data.

5. The device according to claim 1, wherein the position data is determined, by the processor of the vehicle, by merging the raw data with dynamics data describing movement of the vehicle.

6. The device according to claim 1, determining, by the processor of the vehicle, the accuracy of the position data.

7. The device according to claim 6, wherein the data packets are created depending on a number of parameters including at least one of a number of satellites, vehicle acceleration, deviation of the vehicle position from a map in a map matching procedure and the accuracy of the position data.

8. The device according to claim 1, wherein the data packets at least partially also contain dynamics data describing movement of the vehicle and/or correction data.

9. The device according to claim 1, wherein the data packets are created, by the processor of the vehicle, depending on instructions that were received from the server.

10. The device according to claim 1, wherein the data packets or at least a part of the data packets, are stored first, by the processor of the vehicle, and transmitted, by the processor of the vehicle, only when a WLAN communications network is available.

11. The device according to claim 1, wherein the data packets are created, by the processor of the vehicle, depending on a number of parameters including at least one of a number of satellites, vehicle acceleration and deviation of the vehicle position from a map in a map matching procedure.

12. The device according to claim 1, wherein the data packets or at least the raw data and/or dynamics data describing movement of the vehicle, are stored first, by the processor of the vehicle, and transmitted, by the processor of the vehicle, to the server only when a wireless local area network (WLAN) is available to the vehicle.

13. A device in a vehicle for transmitting raw satellite navigation data to a server, the device comprising:
    a vehicle dynamics sensor configured to sense vehicle dynamics data;
    a satellite navigation receiver configured to receive satellite navigation signals; and
    a processor configured to:
        determine the raw satellite navigation data from the satellite navigation signals, the raw satellite navigation data including at least one of pseudoranges, Doppler data, carrier phase counter, measurement signal status, signal-to-noise ratio, ephemeris data, ionospheric data, UTC leap second, and SBAS (Satellite Based Augmentation System) data, determine position data from the raw satellite navigation data and the vehicle dynamics data,
        create data packets that contain the position data and at least partially contain the raw satellite navigation data, in response to the server determining that a geographical region requires more coverage,
        create data packets that contain the position data and do not contain the raw satellite navigation data, in response to the server determining that a geographical region does not require more coverage, and
        transmit the created data packets to the server.

* * * * *